Sept. 26, 1967 R. F. JANNINCK 3,344,373

SWITCHING DEVICE EMPLOYING A GLOBULE OF MAGNETIZABLE ELECTRICALLY CONDUCTIVE FLUID

Filed Feb. 7, 1966

*INVENTOR.*
ROBERT F. JANNINCK

BY

ATTY.

United States Patent Office 3,344,373
Patented Sept. 26, 1967

3,344,373
SWITCHING DEVICE EMPLOYING A GLOBULE OF MAGNETIZABLE ELECTRICALLY CONDUCTIVE FLUID

Robert F. Janninck, Chicago, Ill., assignor to Automatic Electric Laboratories, Inc., Northlake, Ill., a corporation of Delaware Filed Feb. 7, 1966, Ser. No. 525,535
4 Claims. (Cl. 335—49)

ABSTRACT OF THE DISCLOSURE

A switching device including a sealed chamber having a pair of electrodes extending thereinto, one from each end of the chamber with a gap therebetween. A globule of electrically conductive mercury having small magnetic particles dispersed therein partially fills the chamber so as to make contact with one of the electrodes, but not with the other. Upon the application of a magnetic field to the device, the globule of mercury deforms to bridge the gap, contacting the other electrode, thereby forming an electrically conductive path between the electrodes.

This invention relates to switching devices, and more particularly to switching devices using an electrically conductive liquid as the switching medium.

The prior art shows a switching device comprising a sealed capsule which is completely filled with a non-conductive fluid having magnetic particles dispersed therein. Upon the application of a magnetic field, the magnetic particles align themselves between electrodes extending into the chamber, thereby completing a path between the electrodes.

Also shown in the prior art are relays which comprise a sealed chamber having a mercury pool therein which, when an electrostatic field is applied thereto, moves to close a path between two electrodes extending into the chamber.

Certain disadvantages are present in these prior art devices. In the case of the first-mentioned switching device, for example, maintaining the magnetic particles dispersed in the non-conducting fluid poses a problem. To prevent settling out, these particles must be agitated or stirred; thus, additional equipment is necessary. Also, only the magnetic particles which are aligned between the electrodes provide an electrical path therebetween. Consequently, the current which traverses this path is limited to what may be carried by these small particles. The current capacity is further diminished due to the high resistance of the path, caused by the many connections between the magnetic particles.

In addition, there is the danger that when the magnetic field is removed, the particles comprising the path between the electrodes will tend to remain in their aligned position, thus causing the circuit to remain closed. This may be overcome by agitation, but again auxiliary equipment is needed which may be cumbersome and which may increase the cost of operating the switching device.

In the case of the second-mentioned, electrostatic type relay, other problems are present. First, relatively high voltages are required to electrostatically move the mercury pool to close the path between the electrodes. Also, it is difficult to insure isolation between the driving circuit used to set up the electrostatic field and the circuit to be switched.

Accordingly, it is a primary object of this invention to provide an improved switching device which uses a magnetic, electrically conductive liquid as the switching medium, and which overcomes the aforementioned difficulties.

The switching device according to the invention features a sealed elongated capsule having a pair of electrodes extending thereinto, one from each end of the capsule in end-to-end relationship with a gap therebetween. A quantity of electrically conductive liquid mercury having magnetic particles suspended therein, is located within the capsule so as to make contact with one of, and partially fill the gap between, the electrodes. Upon the application of a magnetic field, the liquid mercury deforms to close the gap between the electrodes and complete a path therebetween.

One embodiment of the relay according to the invention features, on the inner end of one of the electrodes, a spiral wire basket which holds the magnetic liquid mercury. A second embodiment features, on the inner end of one of the electrodes, a platform which supports the liquid mercury.

Other objects and features of the present invention will become more apparent by reference to the following description taken in conjunction with the accompanying drawings, of which:

FIGS. 1–4 are sectioned side views of four embodiments of switching devices according to the invention.

FIGS. 3A and 3B describe in more detail one of the electrodes of the embodiment shown in FIG. 3.

FIGS. 4A and 4B describe in more detail one of the electrodes of the embodiment shown in FIG. 4.

Figure 1:
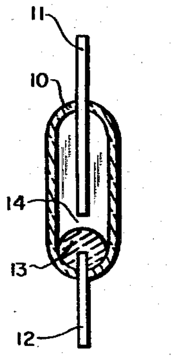

Referring to FIG. 1, there is shown a first embodiment of a switching device according to the invention comprising a sealed envelope or chamber 10 made of glass or some other suitable insulating material. A pair of electrodes 11 and 12, which may be of a ferromagnetic material, such as nickel-iron alloys or merely iron metal, extend into chamber 10 from either end thereof. A quantity of liquid mercury 13 having magnetic particles suspended therein is shown lying in the bottom of the capsule, making contact with and surrounding one end of electrode 12 and partially filling gap 14 between electrodes 11 and 12.

In a preferred embodiment of the switching device according to the invention, electrode 11, at least, will be of ferromagnetic material. This helps to concentrate the magnetic field, which deforms the magnetic mercury 13, at the tip of electrode 11 so that a lesser magnetic field will be needed to operate the switching device.

Figure 2:
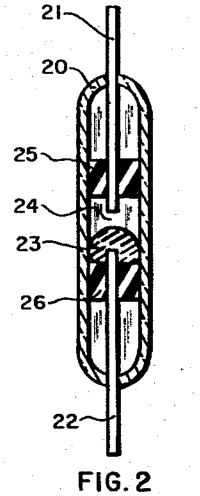

FIG. 2 shows a second embodiment of a switching device according to the invention. This embodiment is similar to the embodiment of FIG. 1 in that it too comprises a sealed capsule 20, a pair of electrodes 21 and 22 extending into capsule 20 from either end thereof, and a quantity of magnetic mercury making contact with and surrounding one end of electrode 22 and partially filling gap 24 between electrodes 21 and 22. This embodiment has in addition to the aforementioned parts, a pair of insulating spacers 25 and 26 placed into capsule 20. One electrode extends through each spacer as shown in FIG. 2. This enables the switching device to be assembled more easily because electrodes 21 and 22 are automatically aligned with respect to one another upon insertion of the spacers, with their electrodes in place therein, into the capsule. In addition to making the device more easy to assemble, spacers 25 and 26 also aid in the support of electrodes 21 and 22.

This embodiment of the switching device, because of spacer 26, permits the use of a smaller droplet of liquid mercury. This is due to the fact that the lower, rounded portion of capsule 20 need not be filled as in the embodiment of FIG. 1.

Figure 3:
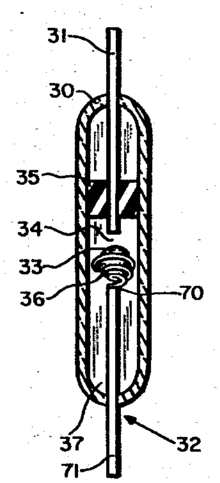

FIG. 3 shows another switching device embodying the invention which, like the structure of FIG. 2 comprises a sealed capsule 30, with a pair of electrodes 31 and 32 extending thereinto from either end of the capsule. Here, however, only one of the electrodes 31 is inserted into an aligning spacer 35. The second electrode 32, has, either fastened thereto, or integrally formed therewith, a wire spiral basket 36 (shown in greater detail in FIGS. 3A and 3B), which hold the quantity of magnetic, electrically conductive mercury 33. The droplet of mercury 33 in this manner makes contact with electrode 32 and partially fills gap 34 between the two electrodes, as does the quantity of magnetic mercury in the previous embodiments shown. This embodiment of the switching device, however, will operate more quickly than those shown in FIGS. 1 and 2. Here the mercury does not come into physical contact with the side of the capsule when deformation takes place after a magnetic field is applied along the axis of the capsule; thus, less friction is present and the mercury can deform to fill gap 34 between the electrodes more quickly.

All of the embodiments shown should, to provide optimum performance thereof, be kept in a vertically oriented position. This embodiment, however, in addition to being kept vertically for the above reason, must be kept oriented in this manner to prevent the droplet of mercury 33 from falling from wire basket 36 to the bottom 37 of the capsule 30.

Figure 3A:
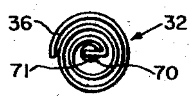
Figure 3B:
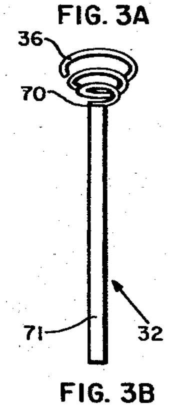

FIGS. 3A and 3B illustrate electrode 32 of the embodiment of the switching device shown in FIG. 3. As can be seen, wire basket 36 is a spiral-shaped length of metal wire which forms the upper portion of electrode 32. Wire basket 36 is located at the inner end 70 of rod portion 71 of electrode 32.

Figure 4:
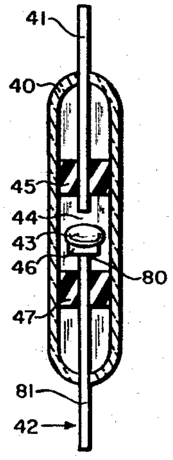

Referring to FIG. 4, there is shown still another embodiment of a switching device, according to the invention, comprising two electrodes 41 and 42 which have been placed through aligning spacers 45 and 47, respectively, and have been inserted into the ends of capsule 40, with a gap 44 therebetween. One electrode 42 has affixed to, or has integrally formed at its inner end, a concave, "dish"-like platform 46 (shown best in FIGS. 4A and 4B); upon which rests a mercury droplet 43. By using platform 46 there is a lesser amount of friction acting against mercury droplet 43 upon the application of a magnetic field than in the embodiment shown in FIG. 3. Thus, this embodiment is able to operate still more quickly.

This version of the switching device is also preferably kept in a vertical position at all times, both to provide optimum performance thereof and so as to prevent the mercury droplet 43 from falling beneath platform 46. However, by coating the platform surface with a metal which is wettable by mercury, such as molybdenum, the chances of the mercury falling from the platform are lessened.

Figure 4A:
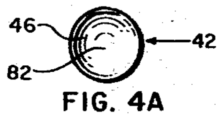
Figure 4B:
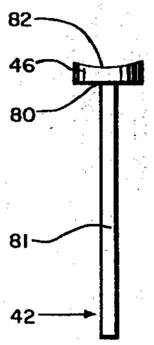

FIGS. 4A and 4B show the electrode 42 of the embodiment of the switching device shown in FIG. 4. Platform portion 46 is a metallic "dish"-shaped piece which is located at inner end 80 of rod portion 81 of electrode 42. The concave surface 82 upon which the mercury droplet 43 rests, can readily be seen in FIG. 4B.

Figure 5:
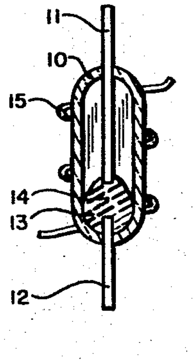
FIG. 5 is the switching device of FIG. 1, shown in its operated state.

FIG. 5 illustrates the embodiment of FIG. 1 as it would appear in its operated condition. Actuation of the switch is achieved by a coil 15 wound about capsule 10 which, when energized, produces a magnetic field which deforms the mercury 13 in a direction and amount to fill gap 14, and at the same time to complete a path between electrodes 11 and 12.

It is not essential that the magnetic operating field be supplied by means of a coil wound about the capsule. A permanent magnet of sufficient strength, brought into close proximity to the switching device, will have a similar effect.

Figure 6:
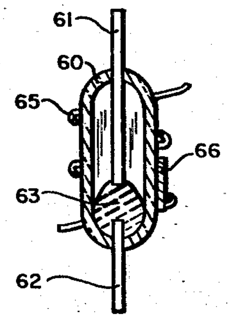
FIG. 6 shows a normally closed embodiment of a switching device according to the invention.

As shown in FIG. 6, it is possible too, to construct a normally closed switching device. In this case, a permanent magnet 66 is located near to capsule 60 so as to maintain a magnetic mercury globule 63 in an elongated state; thus completing an electrical path between electrodes 61 and 62. When a coil 65, wound on the capsule, is energized it produces a magnetic field greater than, and of a polarity opposite to that of the field produced by permanent magnet 66. Responding to the greater field produced by coil 65, magnetic mercury 63 will deform and break the connection between electrodes 61 and 62.

A description will now be given as to what actually takes place upon the application of the magnetic operating field to a normally open embodiment of a switching device according to the invention. When the magnetic field is applied along the axis of the capsule, the quantity of magnetic mercury or other suitable conducting liquid having magnetic properties, will deform so that the magnetic energy of the system may be decreased. The deformation of the liquid will be composed of an elongation in a direction parallel to the axis of the capsule, and a contraction in the direction perpendicular to the axis of the capsule. The liquid can therefore fill the space between the two electrodes thereby bridging the gap to close an electrical path therebetween.

When the magnetic field is removed from the capsule, the surface tension of the liquid restores the mercury to its original shape, thereby breaking the electrical contact between the two electrodes.

The deformation of the magnetic mercury of a normally closed embodiment of a switching device, as shown in FIG. 6, will be comprised of an elongation in a direction perpendicular to the axis of the capsule, and a contraction in the direction parallel to the axis of the capsule.

One method by which magnetic mercury may be prepared is by causing the surface of preformed magnetic particles to be wettable by mercury. In this case, small particles of iron are chemically cleaned and coated with a metal, such as copper, lead, tin or silver which is wettable by mercury.

The magnetic mercury which is used in a preferred embodiment of the switching device according to the invention is a suspension of very small particles of iron, nickel, cobalt or certain magnetic alloys of these elements, in liquid mercury, which is prepared by the electrolysis of an aqueous iron, cobalt, or nickel salt solution on a mercury drop electrode. If the particles are too large to form a true suspension, they will rise to the top of the mercury and float there, thus making the mercury unfit for use in the switching device. On the other hand, if the particles are too small (smaller than domain size), they become permanent magnets which, when once aligned, will remain aligned, thus preventing the switching device from opening. The size of the ferromagnetic particles formed in the mercury is controlled by the magnitude of the voltage and current used in this procedure.

Thus, the switching device according to the invention has the advantages of a liquid metal contacting device, e.g. low contact resistance, freedom from contact welding or sticking, and the absence of contact bounce, plus the additional advantages over the prior art devices cited above of: returning to its normal condition readily after removal of the magnetic operating field because the magnetic particles suspended in the mercury do not actually make contact with one another as in the first-mentioned device and because, the surface tension of the mercury helps to restore the globule to its original position; being able to be operated by relatively low voltages in the case where an electromagnetic coil is used to produce the operating field; and having complete isolation between the circuitry used to activate the operating coil and the circuit to be switched.

It will be obvious to those skilled in the art that changes and modifications may be made without departing from this invention in its broadest aspects and therefore the aim in the appended claims is to cover all such changes and modifications as are within the true spirit and scope of this invention.

What is claimed is:

1. A switching device comprising: a sealed chamber of insulating material; first and second electrodes extending into said chamber;

the inner ends of said first and second electrodes facing upward and downward, respectively, in end-to-end relationship, with a gap therebetween; cup-shaped means secured to the inner end of said first electrode and supporting a globule of electrically conductive liquid having magnetic properties within said gap and in electrical contact with said first electrode and spaced from said second electrode and said chamber; and means for producing a magnetic field in said chamber which field causes the magnetic liquid to deform, bridging said gap to make electrical contact with said second electrode, thereby forming an electrically conductive path between said electrodes.

2. A switching device as claimed in claim 1, wherein said support means comprises a platform having a concave surface confronting the inner end of said second electrode.

3. A switching device as claimed in claim 1, wherein said cup-shaped means comprises a basket formed of wire wound into a spiral, successive turns of which are sufficiently close to one another to support said globule therein.

4. A switching device as claimed in claim 1, wherein said sealed chamber comprises a vertically oriented, elongated vitreous tube, wherein said electrodes extend thereinto, one from each end of said tube, wherein said means for producing a magnetic field in said chamber includes a coil wound about said chamber, and wherein said coil produces a magnetic field along the vertical axis of said tube so that said electrically conductive liquid is deformed by elongation in a direction parallel to said axis, and by contraction in a direction perpendicular to said axis.

References Cited

UNITED STATES PATENTS

| | | | |
|---|---|---|---|
| 2,247,493 | 7/1941 | Harrison et al. | 335—51 |
| 3,103,562 | 9/1963 | Noia | 335—280 |
| 3,289,126 | 11/1966 | Hurvitz | 335—47 |

BERNARD A. GILHEANY, *Primary Examiner.*

H. BROOME, *Assistant Examiner.*